(12) United States Patent
Suzuki et al.

(10) Patent No.: US 9,970,761 B2
(45) Date of Patent: May 15, 2018

(54) EVENT LOCATION ANALYSIS SYSTEM AND MEASUREMENT PROCESSING METHOD

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 535 days.

(21) Appl. No.: 14/549,634

(22) Filed: Nov. 21, 2014

(65) Prior Publication Data
US 2015/0211846 A1 Jul. 30, 2015

(30) Foreign Application Priority Data
Jan. 27, 2014 (JP) ................. 2014-012699

(51) Int. Cl.
*G01B 21/00* (2006.01)
*G01C 15/00* (2006.01)

(52) U.S. Cl.
CPC ................. *G01C 15/00* (2013.01)

(58) Field of Classification Search
None
See application file for complete search history.

(56) References Cited

U.S. PATENT DOCUMENTS

2014/0278084 A1* 9/2014 Lau .................. G01S 19/34
701/526
2015/0071090 A1* 3/2015 Mohammed ...... H04M 1/72569
370/252

FOREIGN PATENT DOCUMENTS

| JP | H10325735 A | 12/1998 |
|---|---|---|
| JP | 2003-273883 A | 9/2003 |
| JP | 2005-157410 | 6/2005 |
| JP | 2007-193475 | 8/2007 |
| JP | 2010-117241 A | 5/2010 |

OTHER PUBLICATIONS

Japanese Office Action dated Aug. 22, 2017 in corresponding Japanese Patent Application No. 2014-012699 (5 pages) (4 pages English Translation).

* cited by examiner

*Primary Examiner* — Whitney T Moore
(74) *Attorney, Agent, or Firm* — Staas & Halsey LLP

(57) ABSTRACT

An event location analysis system includes a first wireless terminal device. The first wireless terminal device includes a first measurement unit, a second measurement unit, and a first processor. The second measurement unit consumes larger amounts of power than the first measurement unit consumes. The first processor is configured to transmit a first notification signal upon detecting a first event on basis of a measurement value of the first measurement unit. The first processor is configured to start the second measurement unit upon receiving a second notification signal. The first processor is configured to activate a measurement operation of the first measurement unit and a measurement operation of the second measurement unit after the second measurement unit is started. The first processor is configured to stop the measurement operation of the second measurement unit after a predetermined time has elapsed since the start of the second measurement unit.

6 Claims, 13 Drawing Sheets

FIG. 5

| MEASUREMENT TIME | ACCELERATION IN X-AXIS DIRECTION | ACCELERATION IN Y-AXIS DIRECTION | ACCELERATION IN Z-AXIS DIRECTION |
|---|---|---|---|
| 09:32:15.000 | ... | ... | ... |
| 09:32:15.100 | ... | ... | ... |
| ⋮ | ⋮ | ⋮ | ⋮ |

EVENT LOCATION ANALYSIS SYSTEM AND MEASUREMENT PROCESSING METHOD

CROSS-REFERENCE TO RELATED APPLICATION

This application is based upon and claims the benefit of priority of the prior Japanese Patent Application No. 2014-012699, filed on Jan. 27, 2014, the entire contents of which are incorporated herein by reference.

FIELD

The embodiments discussed herein are related to an event location analysis system and a measurement processing method.

BACKGROUND

Conventionally, techniques for monitoring a road surface abnormality, such as a level difference in a road surface, a crack in the ground, and the like, are known. For example, there is a system in which a driver of an automobile gives a notification about accident information including an accident occurrence location, and the like, to an information collection center using a mobile phone with a global positioning system (GPS) that positions a location of a road surface, or using a car navigation device with a communication function. The information collection center aggregates accident information, and the like, which have been collected from respective drivers, and estimates an accurate accident occurrence location on the basis of a result of aggregation.

Furthermore, in recent years, wireless terminal devices, such as a smart phone, and the like, which include an acceleration sensor therein, have been widely used, and therefore, a system that diagnoses a road surface condition on the basis of a measurement result of an acceleration sensor is also known.

Related techniques are disclosed in, for example, Japanese Laid-open Patent Publication No. 2005-157410 and Japanese Laid-open Patent Publication No. 2007-193475.

In accurately positioning a location of a road surface, a wireless terminal device often uses GPS, and it is desired to reduce an operation time of GPS and thereby reduce the power consumption of GPS because the power consumption used by GPS for performing measurement operation is large.

SUMMARY

According to an aspect of the present invention, provided is an event location analysis system including a first wireless terminal device. The first wireless terminal device includes a first measurement unit, a second measurement unit, and a first processor. The second measurement unit consumes larger amounts of power than the first measurement unit consumes. The first processor is configured to transmit a first notification signal upon detecting a first event on basis of a measurement value of the first measurement unit. The first processor is configured to start the second measurement unit upon receiving a second notification signal. The first processor is configured to activate a measurement operation of the first measurement unit and a measurement operation of the second measurement unit after the second measurement unit is started. The first processor is configured to stop the measurement operation of the second measurement unit after a predetermined time has elapsed since the start of the second measurement unit.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a sensor log table;

DESCRIPTION OF EMBODIMENTS

Hereinafter, embodiments of an event location analysis system and a measurement processing method will be described in detail with reference to the accompanying drawings. Note that a technique disclosed herein is not limited to the following embodiments. Furthermore, the following embodiments may be combined as appropriate to the extent that there is no contradiction.

First Embodiment

Figure 1:
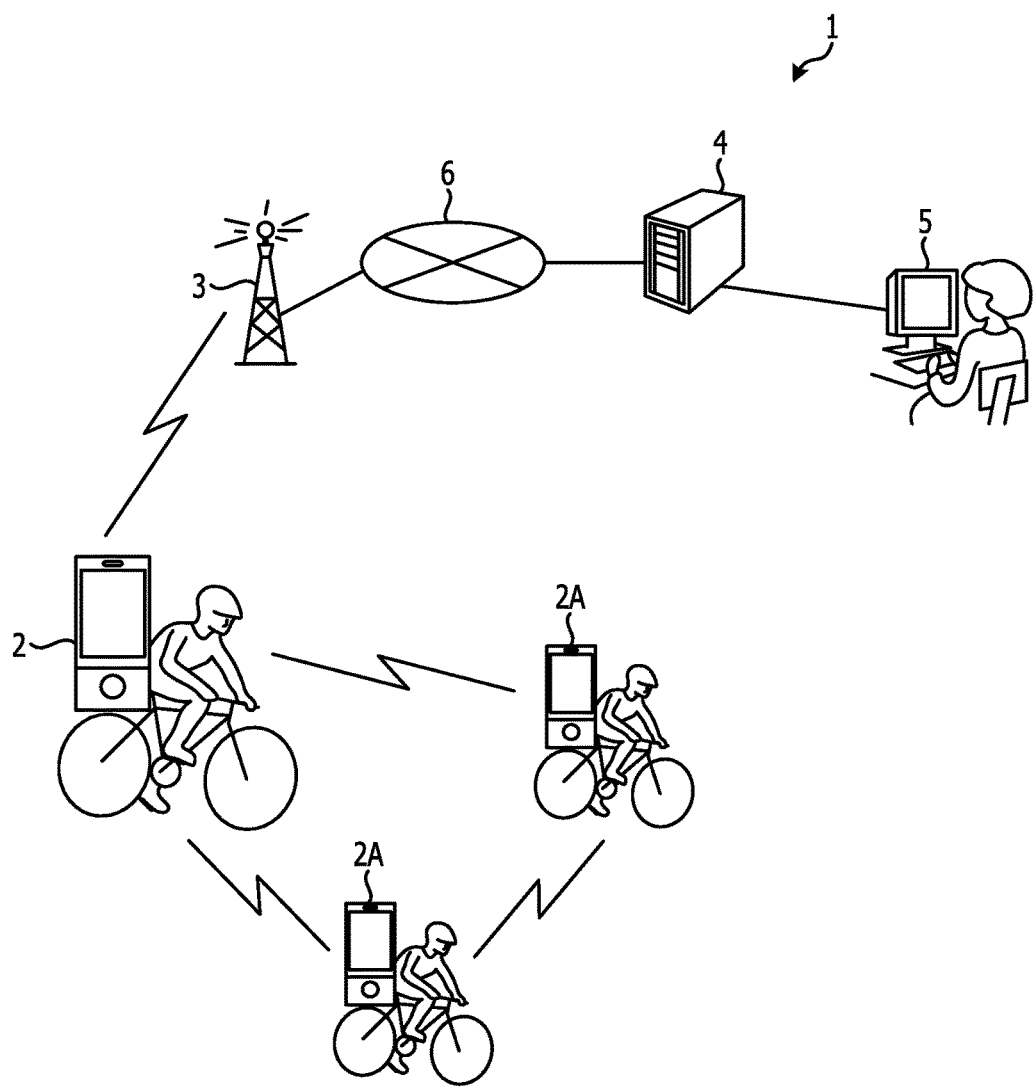
FIG. 1 is a diagram illustrating an example of a road surface monitor system according to an embodiment.

FIG. 1 is a diagram illustrating an example of a road surface monitor system according to an embodiment. A road surface monitor system 1 illustrated in FIG. 1 includes wireless terminals 2, a base station 3, a collection server 4, and a management terminal 5. Each of the wireless terminals 2 is, for example, a wireless terminal device, such as a mobile phone, a smart phone, a tablet terminal, and the like. The base station 3 is a relay device that is provided for each wireless zone and wirelessly connects to a wireless terminal 2 in the corresponding wireless zone. The collection server 4 corresponds to a management device such as, for example, a computer or the like, which connects to the base station 3 via an Internet network 6, collects information from each wireless terminal 2, and analyzes an abnormality of a road surface and a point of the abnormality on the basis of the collected information. The management terminal 5 connects to the collection server 4, and outputs a notification regarding a road surface condition on the basis of an analysis result received from the collection server 4.

In each wireless terminal 2, for example, monitoring application software is installed in advance. The monitoring application software causes the wireless terminal 2 to execute a process of a monitoring application for monitoring the road surface condition. A user travels by a vehicle, such as a bicycle, an automobile, and the like, carrying a wireless terminal 2 in which the monitoring application is running. When the monitoring application is started, the wireless terminal 2 detects an abnormality, such as a level difference in a road surface and the like, on the basis of a measurement value of an acceleration sensor in the vertical direction, which will be described later, and obtains abnormality detection information including the detection result. If the wireless terminal 2 detects an abnormality of the road surface, the wireless terminal 2 obtains GPS information including location information of a location in the vicinity of an abnormality detection location with GPS, which will be described later. Then, the wireless terminal 2 notifies the collection server 4 of packets including the abnormality detection information, the GPS information, and the like, via the base station 3.

Figure 2:
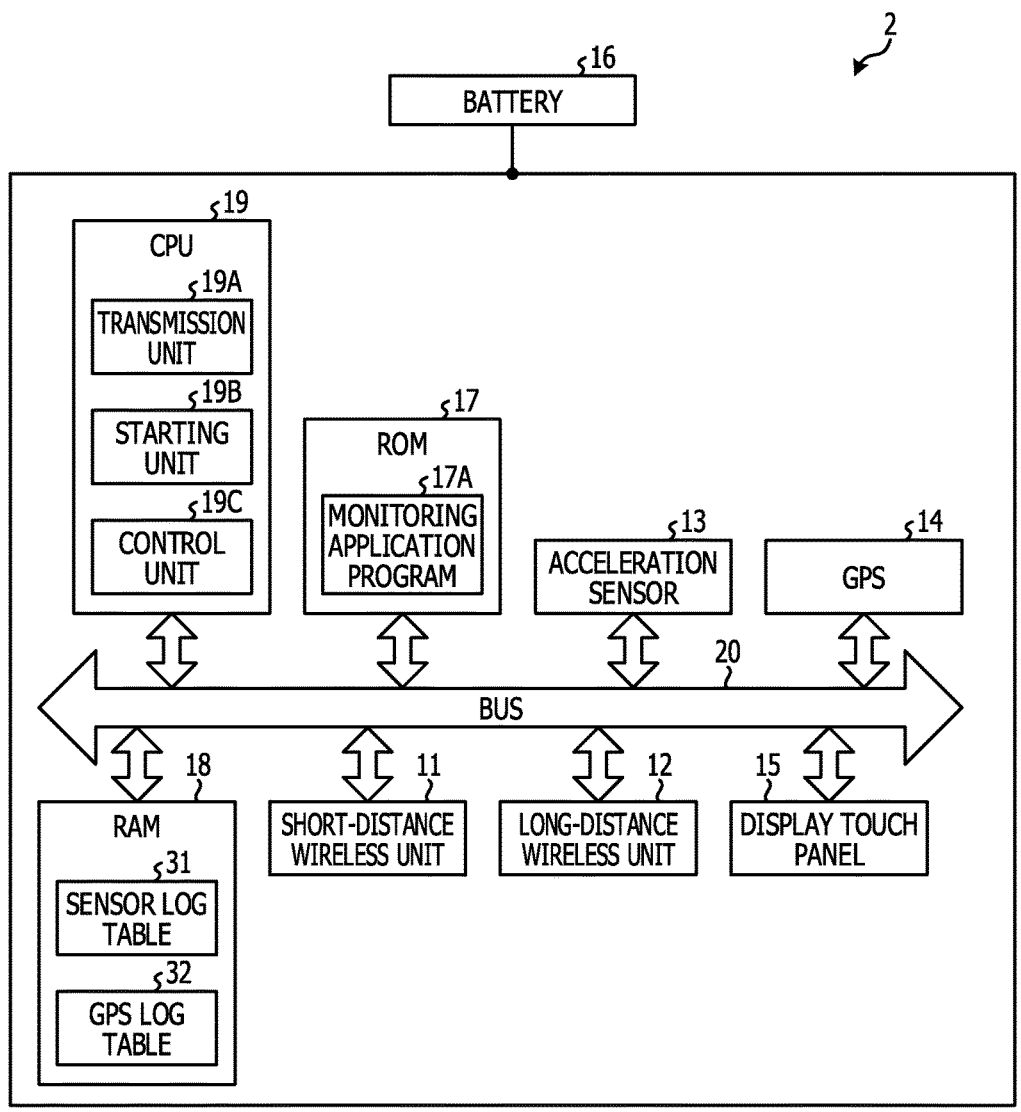
FIG. 2 is a diagram illustrating an example of a wireless terminal.

FIG. 2 is a diagram illustrating an example of a wireless terminal 2. The wireless terminal 2 illustrated in FIG. 2 includes a short-distance wireless unit 11, a long-distance wireless unit 12, an acceleration sensor 13, a GPS 14, a display touch panel 15, and a battery 16. Furthermore, the wireless terminal 2 includes a read-only memory (ROM) 17, a random access memory (RAM) 18, a central processing unit (CPU) 19, and a bus 20.

The short-distance wireless unit 11 is a wireless unit of the wireless local area network (LAN) type such as, for example, Wireless Fidelity (WiFi) (registered trademark), which has a wireless communication distance of about several hundred meters and performs wireless communication with other wireless terminals 2 located within this short-distance wireless range. The long-distance wireless unit 12 is a wireless unit of a wireless type such as, for example, the Long Term Evolution (LTE) (registered trademark) type, the third generation (3G) type, the Global System for Mobile Communications (GSM) (registered trademark), and the like. The acceleration sensor 13 is a first measurement unit that measures accelerations of the wireless terminal 2 in three axis directions, that is, an X-axis direction, a Y-axis direction, and a Z-axis direction. The acceleration sensor 13 measures an acceleration in the vertical direction to the road surface on the basis of the accelerations in the three directions. The GPS 14 is a second measurement unit that measures the current location of the wireless terminal 2, for example, using a GPS satellite. The display touch panel 15 is an interface that displays various types of information on a display screen and receives various types of information and various commands in accordance with a touch operation on the display screen. The battery 16 is a power feeding unit that supplies power to each component element of the wireless terminal 2. Note that, among component elements of the wireless terminal 2, the power consumption of the GPS 14 for performing a measurement operation is larger than the power consumptions of the other component elements.

The ROM 17 is a storage area that stores various types of information and various programs such as, for example, a monitoring application program 17A, and the like. The RAM 18 is a storage area that stores various types of information such as, for example, a sensor log table 31, a GPS log table 32, and the like. The sensor log table 31 stores a sensor log of the acceleration sensor 13. The GPS log table 32 stores a GPS log of the GPS 14.

The CPU 19 controls the entire wireless terminal 2. The CPU 19 reads out the monitoring application program 17A stored in the ROM 17 and executes a process of the monitoring application including functions of a transmission unit 19A, a starting unit 19B, a control unit 19C, and the like, in accordance with read-out monitoring application program 17A. Note that, when the CPU 19 starts the monitoring application, the CPU 19 executes abnormality detection processing for the road surface condition using the acceleration sensor 13, and shifts to a standby state of waiting for short-distance wireless communication from other wireless terminals 2 in vicinity. Hereinafter, a wireless terminal 2 including a component may be referred to as a self-terminal for the component.

Figure 3A:
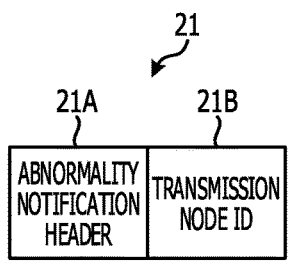
FIGS. 3A-3C are diagrams each illustrating an example of various packets of a wireless terminal.
Figure 3B:
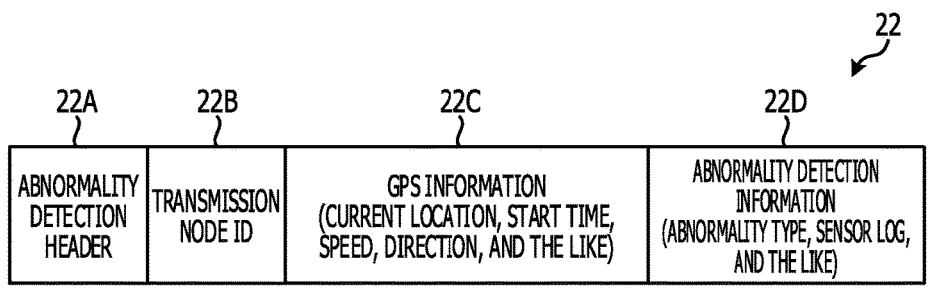
Figure 3C:
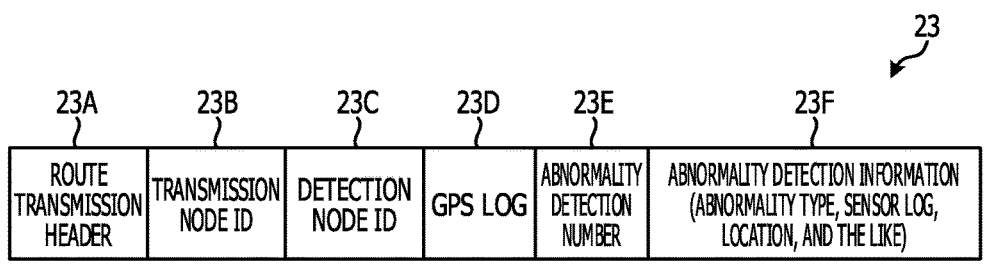

The CPU 19 determines whether or not the measurement value of the acceleration sensor 13, which is the acceleration in the vertical direction to the road surface, has exceeded a threshold. The threshold is, for example, a threshold of the acceleration with which it is determined whether there is an abnormality of a level difference in the road surface. If the measurement value in the vertical direction has exceeded the threshold, the CPU 19 determines that an abnormality of the road surface has been detected. If it is determined that an abnormality of the road surface has been detected, the transmission unit 19A transmits an abnormality notification packet to neighboring wireless terminals 2 within the short-distance wireless range in broadcast communication via the short-distance wireless unit 11. For the sake of convenience, the neighboring wireless terminals 2 are also referred to as wireless terminals 2A. The abnormality notification packet is, for example, a notification signal transmitted to the neighboring wireless terminals 2A. FIGS. 3A-3C are diagrams each illustrating an example of various packets. An abnormality notification packet 21 illustrated in FIG. 3A is a packet used in communication via the short-distance wireless unit 11, and includes an abnormality notification header 21A that indicates the occurrence of an abnormality and a transmission node identifier (ID) 21B for identifying the wireless terminal 2 that has transmitted the abnormality notification packet.

Figure 4:
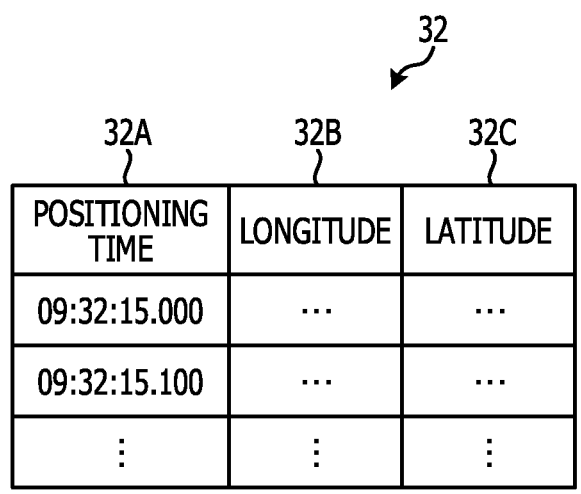
FIG. 4 is a diagram illustrating an example of a GPS log table.

The starting unit 19B determines whether or not an abnormality notification packet 21 has been received from another wireless terminal 2 via the short-distance wireless unit 11. If an abnormality notification packet 21 has been received, the starting unit 19B determines whether or not the GPS 14 is in operation. If the GPS 14 is in operation, the control unit 19C starts logging of a travel route of the self-terminal using the GPS 14 in operation, and stores a GPS log thereof in the GPS log table 32 stored in the RAM 18. FIG. 4 illustrates an example of a GPS log table 32. The GPS log table 32 illustrated in FIG. 4 manages a positioning time 32A of the GPS 14, a longitude 32B, and a latitude 32C in association with one another.

If the GPS 14 is not in operation, the starting unit 19B starts the GPS 14. The control unit 19C starts logging of the travel route of the self-terminal using the GPS 14, and stores the GPS log thereof in the GPS log table 32. The control unit 19C also starts an operation timer. If the operation timer indicates that time is up, the control unit 19C stops the GPS 14. Note that the set time of the operation timer is, for example, a time that is dependent on a moving speed of the self-terminal, but may be set to a fixed time.

The control unit 19C measures values of accelerations of the acceleration sensor 13 in an X-axis direction, a Y-axis direction, and a Z-axis direction at a predetermined timing, and stores the measurement results as sensor logs in the sensor log table 31 stored in the RAM 18. FIG. 5 illustrates an example of the sensor log table 31. The sensor log table 31 illustrated in FIG. 5 manages a measurement time 31A, the acceleration 31B in the X-axis direction, the acceleration 31C in the Y-axis direction, and the acceleration 31D in the Z-axis direction in association with one another. The control unit 19C activates measurement operations of the acceleration sensor 13 and the GPS 14 to execute processing of abnormality detection in road surface condition by the acceleration sensor 13 while executing logging of the travel route of the self-terminal using the GPS 14.

If a road surface abnormality is detected by the acceleration sensor 13 while logging of the travel route of the self-terminal using the GPS 14 is performed, the control unit CPU 19 stores the abnormality detection location and the abnormality detection information in the RAM 18.

The CPU 19 of the wireless terminal 2 transmits an abnormality detection packet 22 to the collection server 4 via the long-distance wireless unit 12 when the self-terminal detects a road surface abnormality. The abnormality detection packet 22 illustrated in FIG. 3B includes an abnormality detection header 22A, a transmission node ID 22B, a GPS information 22C, and abnormality detection information 22D. The abnormality detection header 22A is a header that indicates the abnormality detection packet 22. The transmission node ID 22B is an ID for identifying the wireless terminal 2 that has transmitted the abnormality detection packet 22 itself. The GPS information 22C includes, for example, a current location, a start time, a moving speed, a moving direction, and the like. The current location is information on a location of the self-terminal, obtained by the GPS 14 immediately after detection of the road surface abnormality. The start time is a time taken to start measurement by the GPS 14 immediately after detection of the road surface abnormality. The moving speed is obtained on the basis of a distance and the amount of change in time between at least two pieces of location information of the self-terminal, which have been obtained by the GPS 14. The moving direction is obtained on the basis of the amount of change in location between at least two pieces of location information of the self-terminal, which have been obtained by the GPS 14. The abnormality detection information 22D includes an abnormality type, a sensor log, and the like. The abnormality type is a type of an abnormality such as the level difference in a road surface and the like. The sensor log is log information such as the acceleration in the X-axis direction, the acceleration in the Y-axis direction, and the acceleration in the Z-axis direction, and the like, of the acceleration sensor 13 at each measurement time.

When an abnormality notification packet 21 is received, the CPU 19 (starting unit 19B) of the wireless terminal 2A starts the GPS 14. After the GPS 14 is started, the CPU 19 (control unit 19C) starts logging of the travel route of the self-terminal and executes abnormality detection processing of detecting an abnormality in a road surface. Furthermore, the CPU 19 (control unit 19C) transmits a route transmission packet 23 including an analysis result of abnormality detection processing to the collection server 4 via the long-distance wireless unit 12. The route transmission packet 23 illustrated in FIG. 3C includes a route transmission header 23A, a transmission node ID 23B, a detection node ID 23C, a GPS log 23D, an abnormality detection number 23E, and abnormality detection information 23F. The route transmission header 23A is a header that indicates the route transmission packet 23. The transmission node ID 23B is an ID for identifying the wireless terminal 2A that transmits the route transmission packet 23 itself. The detection node ID 23C is an ID for identifying the wireless terminal 2 that has detected a road surface abnormality, that is, the wireless terminal 2 that has transmitted the abnormality notification packet 21. The GPS log 23D is a log result of the GPS 14 for the travel route of the wireless terminal 2A that has received the abnormality notification packet 21. The abnormality detection number 23E is the number of times a road surface abnormality has been detected by the acceleration sensor 13 while logging is performed by the GPS 14. The abnormality detection information 23F includes, for example, an abnormality type, a sensor log, a location, and the like. Note that the abnormality type is the type of a road surface abnormality detected by the self-terminal. The sensor log is a log of the acceleration sensor 13 at an abnormality detection location at which the self-terminal has detected the abnormality. The location is location information obtained by the GPS 14 at the abnormality detection location.

Figure 6:
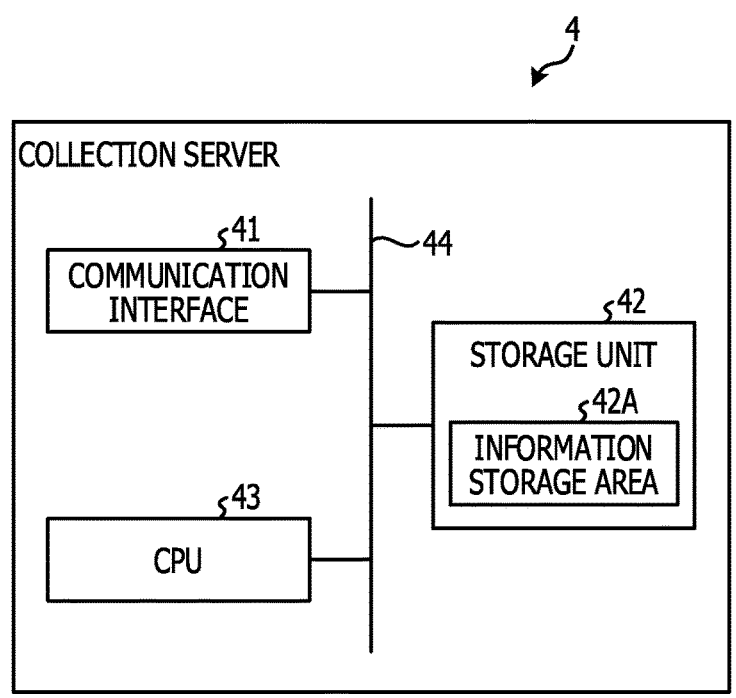
FIG. 6 is a diagram illustrating an example of a collection server.

FIG. 6 is a diagram illustrating an example of the collection server 4. The collection server 4 illustrated in FIG. 6 includes a communication interface 41, a storage unit 42, a CPU 43, and a bus 44. The communication interface 41 is, for example, an interface used in communication for connecting to the Internet network 6, the management terminal 5, and the like. The storage unit 42 is a storage area that stores various types of information. The storage unit 42 includes an information storage area 42A that stores road surface information regarding a collection target node. If the wireless terminal 2 that has detected a road surface abnormality is the collection target node, the road surface information regarding the collection target node is information including, for example, the GPS information and the abnormality detection information included in the abnormality detection packet 22. Further, the road surface information regarding the collection target node is information including the GPS log, the abnormality detection information, and the like, included in the route transmission packet 23 that includes a detection node which is the same as the collection target node. The CPU 43 controls the entire collection server 4.

Figure 7:
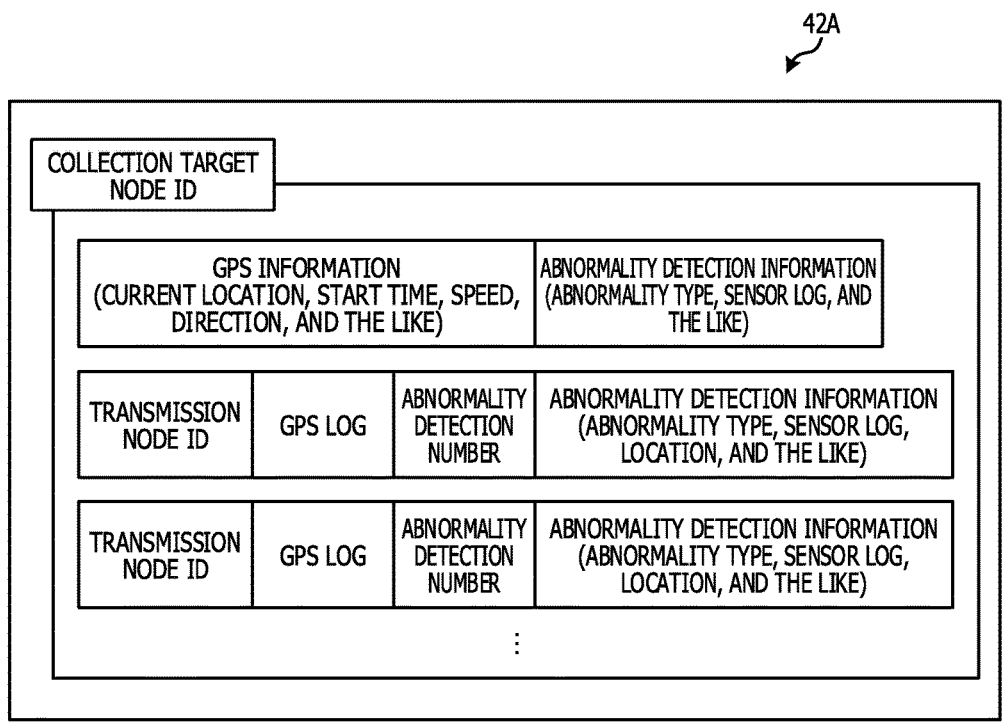
FIG. 7 is a diagram illustrating example of road surface information stored in an information storage area at a collection server side.

The CPU 43 receives the abnormality detection packet 22 and the route transmission packet 23 from each wireless terminal 2 via the communication interface 41 and sets, as a collection target node ID, the transmission node ID 22B in the abnormality detection packet 22. FIG. 7 is a diagram illustrating an example of road surface information stored in the information storage area 42A at the collection server 4 side. The CPU 43 stores road surface information, such as the GPS information 22C and the abnormality detection information 22D included in the abnormality detection packet 22, in the information storage area 42A in association with the collection target node ID, as illustrated in FIG. 7. Furthermore, if the CPU 43 receives the route transmission packet 23, the CPU 43 extracts the detection node ID 23C included in the route transmission packet 23. If detection node ID 23C corresponds to the collection target node ID, the CPU 43 stores road surface information, such as the transmission node ID 23B, the GPS log 23D, the abnormality detection number 23E, and the abnormality detection information 23F included in the route transmission packet 23, in the information storage area 42A corresponding to the collection target node ID. That is, the CPU 43 provides links to the abnormality detection packet 22 using the detection node ID 23C included in the route transmission packet 23, so that the abnormality detection information 22D and 23F of the plurality of wireless terminals 2 may be aggregated.

When the CPU 43 of the collection server 4 receives an abnormality detection packet 22, the CPU 43 starts a timer operation of a monitoring timer and receives route transmission packets 23 regarding the collection target node which is the wireless terminal 2 that has transmitted the abnormality detection packet 22 until the monitoring timer indicates that time is up. Note that the set time of the monitoring timer is a time obtained by adjusting the logging time of the GPS 14 of each wireless terminal 2 that has received the abnormality notification packet 21 in consideration of variations in start time of the GPS 14 and a communication time thereof.

Figure 8:
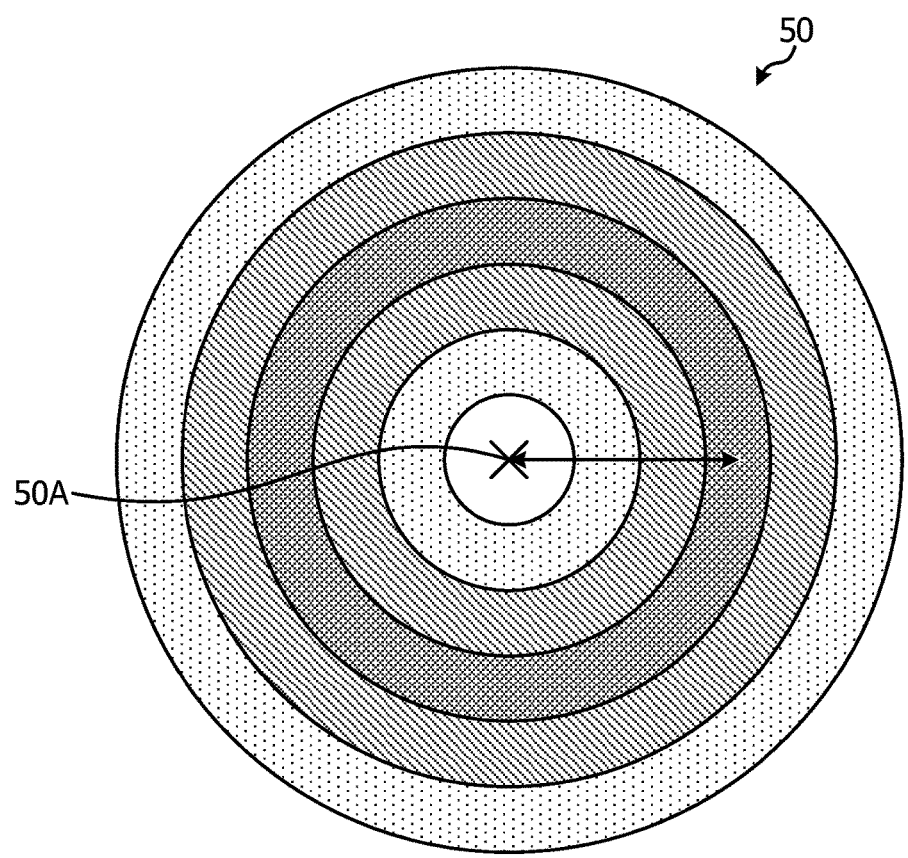
FIG. 8 is a chart illustrating an example of an estimate range.

The CPU 43 stores the road surface information regarding the collection target node in the information storage area 42A until the monitoring timer indicates that time is up. The CPU 43 analyzes an abnormality detection location and an area range that is highly likely to include an abnormality detection location, on the basis of the road surface information stored in the information storage area 42A corresponding to the collection target node ID. FIG. 8 is a chart illustrating an example of an estimate range. As illustrated in FIG. 8, the CPU 43 obtains an estimate range 50 for the collection target node on the basis of the current location, the start time, the moving speed, the moving direction, and the like from the GPS information 22C included in the abnormality detection packet 22. Note that the estimate range 50 is an area range which is highly likely to include an abnormality location. The estimate range 50 is defined such that a GPS positioned point 50A, which corresponds to the current location in the GPS information 22C, is the center of the area range and a distance derived by the start time×the moving speed is the radius thereof. The GPS positioned point 50A corresponds to the location of the self-terminal, which has been first positioned by the GPS 14 after the start of the GPS 14 upon detection of an abnormality in the road surface.

Figure 9:
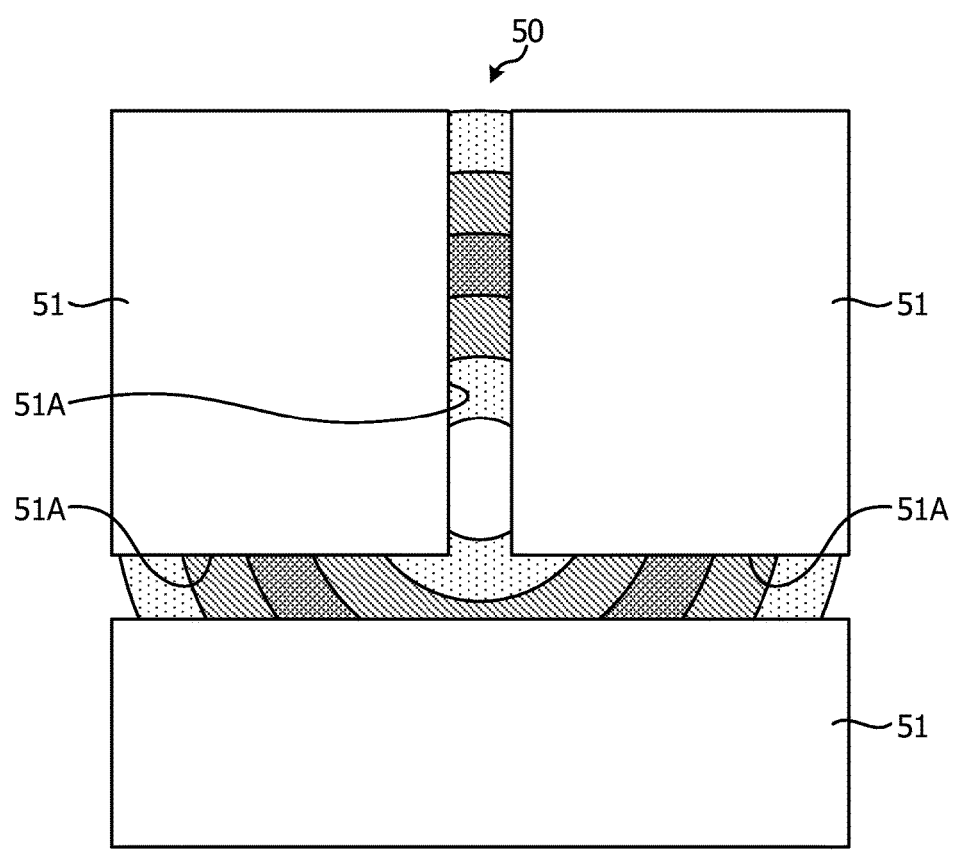
FIG. 9 is a chart illustrating an example in which map information is mapped on an estimate range.

FIG. 9 is a chart illustrating an example in which map information 51 is mapped on the estimate range 50. As illustrated in FIG. 9, the CPU 43 identifies a road surface part 51A within the estimate range 50 by mapping the map information 51 on the estimate range 50, and analyzes an abnormality detection location on the identified road surface part 51A.

Figure 10:
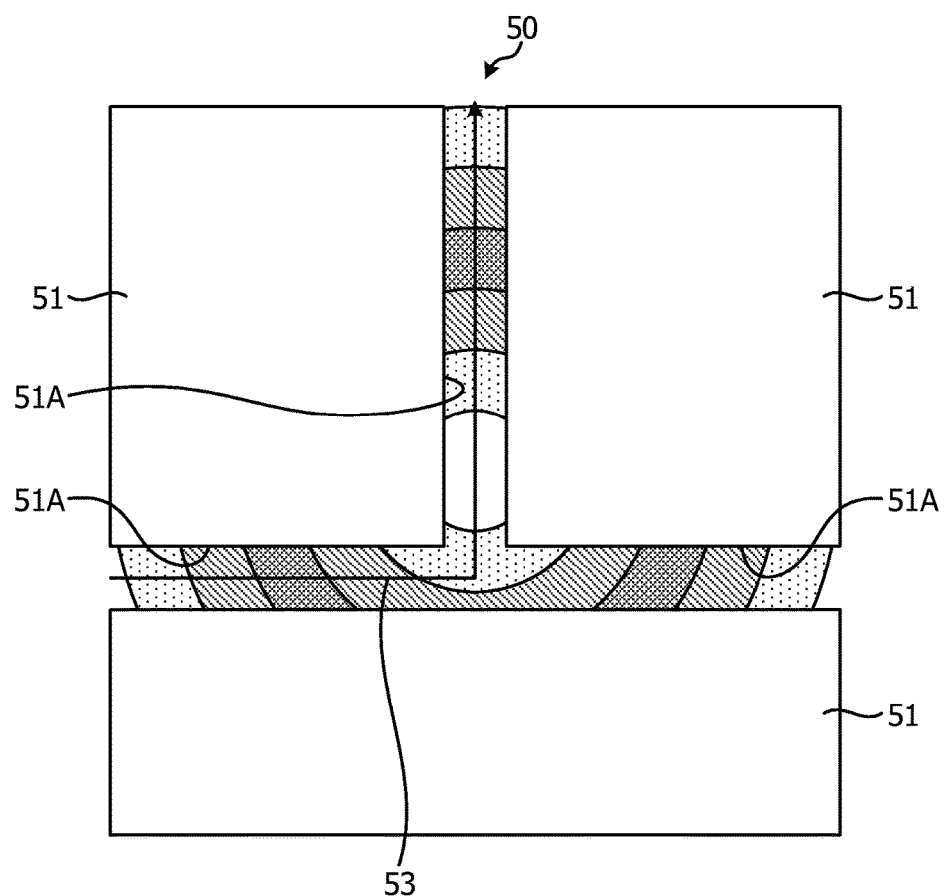
FIG. 10 is a chart illustrating an example of narrowing-down operation of an abnormality detection location.

FIG. 10 is a chart illustrating an example of narrowing-down operation of an abnormality detection location. The CPU 43 narrows down an abnormality detection location in the estimate range 50, for example, on the basis of the GPS information 22C and the abnormality detection information 22D included in the abnormality detection packet 22 and the GPS log 23D and the abnormality detection information 23F included in the route transmission packet 23. The CPU 43 identifies the travel route of a neighboring wireless terminal 2A in the road surface part 51A within the estimate range 50 on the basis of the GPS log 23D included in the route transmission packet 23 corresponding to the collection target node ID illustrated in FIG. 7. If the neighboring wireless terminal 2A passes and detects an abnormality, the CPU 43 stores an abnormality detection location of the neighboring wireless terminal 2A on the basis of the abnormality detection number 23E and the abnormality detection information 23F included in the route transmission packet 23.

If the neighboring wireless terminal 2A passes the GPS positioned point 50A of the wireless terminal 2, at which an abnormality has been first detected, and does not detect an abnormality, the CPU 43 excludes the travel route, which corresponds to the GPS log 23D, of the neighboring wireless terminal 2A from the estimate range 50 to narrow down the estimate range 50. The CPU 43 narrows down an area which is highly likely to include an abnormality detection location from the estimate range 50 by excluding the travel route corresponding to the GPS log 23D of the neighboring wireless terminal 2A from the estimate range 50.

The CPU 43 analyzes a change in an acceleration in the horizontal direction on the basis of the sensor log of the acceleration sensor 13 and uses increase and decrease in acceleration of a bicycle and the existence or non-existence of a curve to narrow down an area that is highly likely to include an abnormality detection location from the estimate range 50. The CPU 43 narrows down the area that is highly likely to include an abnormality detection location from the estimate range 50 to check the area against abnormality detection information transmitted from the neighboring wireless terminal 2A. If there is abnormality detection information transmitted from the neighboring wireless terminal 2A, which corresponds to the area that is highly likely to include the abnormality detection location and indicates a road surface abnormality of the same type (a level difference, a crack in the ground, and the like), the CPU 43 analyses that an abnormality has been detected at the same location as the location at which the wireless terminal 2 has first detected the abnormality. Then, the CPU 43 notifies the management terminal 5 of the abnormality detection information including the analysis result.

If the neighboring wireless terminal 2A detects an abnormality in an area that is less likely to include an abnormality detection location, the CPU 43 assumes that a road surface abnormality has been detected at a different location from the location at which an abnormality was first detected, and stores the road surface abnormality detection information in the storage unit 42. After the CPU 43 stores the abnormality detection information in the storage unit 42, the CPU 43 notifies the management terminal 5 of the abnormality detection information. The CPU 43 narrows down the estimate range 50 for the abnormality that have been first detected using a travel route 53 of the GPS log 23D obtained from the neighboring wireless terminal 2A. The CPU 43 checks the travel route 53 of the GPS log 23D transmitted from the neighboring wireless terminal 2A against the estimate range 50 including the GPS positioned point 50A and notifies the management terminal 5 of abnormality detection information including an abnormality detection location and the area that is highly likely to include an abnormality detection location.

The CPU 43 narrows down the estimate range 50 and, even when there is no longer the area that is highly likely to include an abnormality detection location, the CPU 43 notifies the management terminal 5 of the abnormality detection information and the fact that the area have not been successfully narrowed down.

Figure 11:
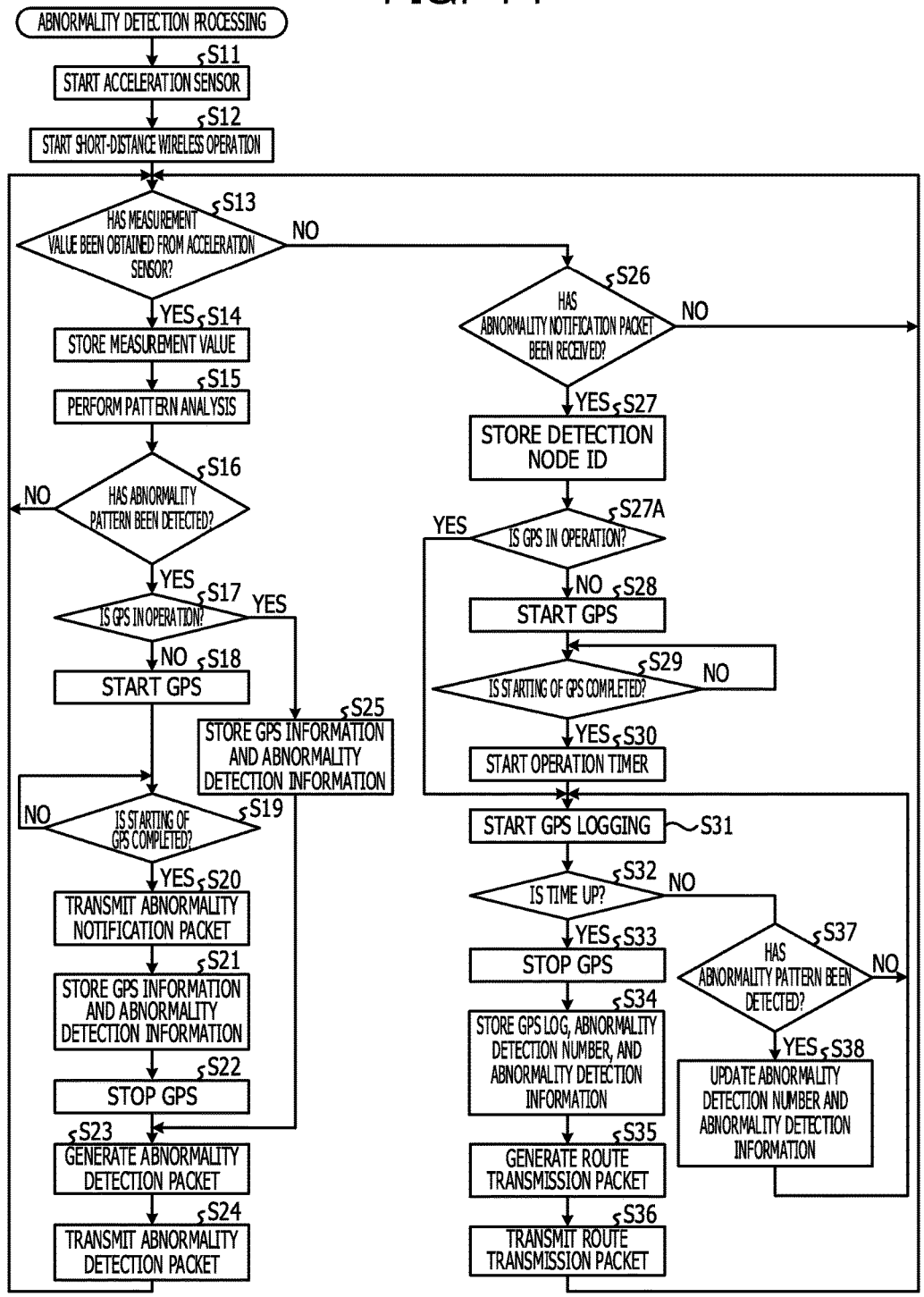
FIG. 11 is a flowchart illustrating an example of processing operation performed by CPUs of wireless terminals involved in abnormality detection processing.

Next, the operation of the road surface monitor system 1 according to the present embodiment will be described. FIG. 11 is a flowchart illustrating an example of processing operation of the CPUs 19 preformed in the wireless terminal 2 and the neighboring wireless terminal 2A involved in abnormality detection processing. The abnormality detection processing illustrated in FIG. 11 is processing of starting, when a road surface abnormality is detected in the wireless terminal 2, the GPS 14 of the neighboring wireless terminal 2A and notifying the collection server 4 of road surface information obtained by the wireless terminal 2 and the neighboring wireless terminal 2A.

In FIG. 11, the CPU 19 at the wireless terminal 2 side starts the acceleration sensor 13 (S11) and starts an operation of the short-distance wireless unit 11 (S12). The CPU 19 determines whether or not a measurement value has been obtained from the acceleration sensor 13 (S13). If a measurement value has been obtained (YES in S13), the CPU 19 stores the obtained measurement value in the sensor log table 31 stored in the RAM 18 (S14).

The CPU 19 performs pattern analysis on the obtained measurement value of the acceleration sensor 13 (S15) and determines, on the basis of the analysis result, whether or not a road surface abnormality pattern has been detected (S16). If the measurement value, in the vertical direction for example, has exceeded a predetermined threshold, the CPU 19 determines that an abnormality pattern of a level difference in a road surface and the like is detected.

If a road surface abnormality pattern is detected (YES in S16), the CPU 19 determines whether or not the GPS 14 is in operation (S17). If the GPS 14 is not in operation (NO in S17), the CPU 19 starts the GPS 14 (S18), and determines whether or not starting of the GPS 14 is completed (S19).

If starting of the GPS 14 is completed (YES in S19), the CPU 19 (transmission unit 19A) transmits the abnormality notification packet 21 to neighboring wireless terminals 2A within the short-distance wireless range in broadcast communication via the short-distance wireless unit 11 (S20). If the abnormality notification packet 21 is received from the wireless terminal 2, the CPU 19 (starting unit 19B) of a neighboring wireless terminal 2A starts the GPS 14 of the self-terminal.

After starting of the GPS 14 of the wireless terminal 2 is completed, the CPU 19 of the wireless terminal 2 measures the current location with the GPS 14, and stores the GPS information 22C and the abnormality detection information 22D in the RAM 18 (S21). The GPS information 22C includes the current location of the wireless terminal 2 obtained by the GPS 14, the start time when the GPS 14 has started, the moving speed of the wireless terminal 2, the moving direction of the wireless terminal 2, and the like. The abnormality detection information 22D includes the abnormality type, the sensor log of the acceleration sensor 13 at the abnormality detection location, and the like.

After storing the GPS information 22C and the abnormality detection information 22D in the RAM 18, the CPU 19 stops the GPS 14 (S22). The CPU 19 may reduce a power consumption used by the GPS 14 by stopping the GPS 14. After stopping the GPS 14, the CPU 19 generates the abnormality detection packet 22 including the GPS information 22C and the abnormality detection information 22D (S23). The CPU 19 transmits the abnormality detection packet 22 to the collection server 4 via the long-distance wireless unit 12 (S24). Thereafter, the CPU 19 causes the process to proceed to S13 to determine whether or not a measurement value has been obtained from the acceleration sensor 13.

If the GPS 14 is in operation (YES in S17), the CPU 19 stores the GPS information 22C and the abnormality detection information 22D in the RAM 18 (S25). Thereafter, the CPU 19 causes the process to proceed to S23 to generate the abnormality detection packet 22.

If a measurement value has not been obtained from the acceleration sensor 13 (NO in S13), the CPU 19 determines whether or not an abnormality notification packet 21 has been received from another wireless terminal 2 via the short-distance wireless unit 11 (S26). If the abnormality notification packet 21 has been received from another wireless terminal 2 (YES in S26), the CPU 19 stores, as a detection node ID, the node ID of the wireless terminal 2 that has transmitted the abnormality notification packet 21 in the RAM 18 (S27).

After storing the detection node ID in the RAM 18, the CPU 19 determines whether or not the GPS 14 of the self-terminal is in operation (S27A). If the GPS 14 of the self-terminal is not in operation (NO in S27A), the CPU 19 (starting unit 19B) starts the GPS 14 (S28) and determines whether or not starting of the GPS 14 is completed (S29). If starting of the GPS 14 of the self-terminal is completed (YES in S29), the CPU 19 starts the operation timer (S30) and starts logging of the travel route of the self-terminal using the GPS 14 (S31). The CPU 19 stores the GPS log of the GPS 14 in the GPS log table 32 stored in the RAM 18. The operation timer is a timer for controlling an operation time of the GPS 14.

The CPU 19 determines whether or not the operation timer started in S30 indicates that time is up (S32). If the operation timer does not indicate that time is up (NO in S32), the CPU 19 determines whether or not an abnormality pattern has been detected (S37). If an abnormality pattern has been detected (YES in S37), the CPU 19 updates the abnormality detection number and the abnormality detection information (S38). Thereafter, the CPU 19 causes the process to proceed to S31 to continue logging of the travel route using the GPS 14. If an abnormality pattern has not been detected (NO in S37), the CPU 19 causes the process to proceed to S31 to continue logging of a travel route using the GPS 14.

If the operation timer indicates that time is up (YES in S32), the CPU 19 (control unit 19C) stops the GPS 14 (S33) and stores the GPS log, the abnormality detection number, and the abnormality detection information in the RAM 18 (S34). The CPU 19 generates the route transmission packet 23 including the GPS log, the abnormality detection number, and the abnormality detection information (S35). The CPU 19 transmits the route transmission packet 23 to the collection server 4 via the long-distance wireless unit 12 (S36) and causes the process to proceed to S13. If the abnormality notification packet is not received from another wireless terminal 2 (NO in S26), the long-distance wireless unit 12 causes the process to proceed to S13 to determine whether or not a measurement value has been obtained from the acceleration sensor 13.

If starting of the GPS 14 is not completed (NO in S29), the CPU 19 causes the process to proceed to S29 to determine whether or not starting of the GPS 14 is completed. If an abnormality pattern has not been detected (NO in S16), the CPU 19 causes the process to proceed to S13 to determine whether or not a measurement value has been obtained from the acceleration sensor 13. If starting of the GPS 14 is not completed (NO in S19), the CPU 19 causes the process to proceed to S19 to determine whether or not starting of the GPS 14 is completed.

In the abnormality detection processing illustrated in FIG. 11, if the CPU 19 of the wireless terminal 2 detects a road surface abnormality before the GPS 14 is started, the CPU 19 starts the GPS 14 and obtains GPS information (the GPS positioned point 50A) of the self-terminal. The CPU 19 transmits an abnormality detection packet 22 including information regarding the GPS positioned point 50A (the current location) of the self-terminal and abnormality detection information to the collection server 4. As a result, if the wireless terminal 2 detects an abnormality, the wireless terminal 2 may notify the collection server 4 of the abnormality detection packet 22 including the GPS information 22C and the abnormality detection information 22D.

If the CPU 19 detects a road surface abnormality before the GPS 14 is started, the CPU 19 transmits an abnormality notification packet 21 to neighboring wireless terminals 2A within the short-distance wireless range in broadcast communication. If the CPU 19 of a neighboring wireless terminal 2A receives the abnormality notification packet 21, the CPU 19 starts the GPS 14 and performs logging of the travel route of the self-terminal using the GPS 14 until the operation timer indicates that time is up. As a result, the neighboring wireless terminal 2A continues logging of the GPS 14 during the set time from the time when the neighboring wireless terminal 2A receives the abnormality notification packet 21 to the time when the operation timer indicates that time is up, and therefore, the neighboring wireless terminal 2A may reduce the power consumption of the GPS 14.

The CPU 19 of the neighboring wireless terminal 2A starts the GPS 14, performs logging of the travel route of the self-terminal using the GPS 14 until the operation timer indicates that time is up, and transmits the route transmission packet 23 including the GPS log 23D thereof to the collection server 4. As a result, the neighboring wireless terminal 2A may notify the collection server 4 of the route transmission packet 23 including the GPS log 23D that indicates the travel route of the self-terminal, and the like.

If the CPU 19 of the neighboring wireless terminal 2A detects a road surface abnormality while logging is performed by the GPS 14, the CPU 19 notifies the collection server 4 of the route transmission packet 23 including, in addition to the GPS log 23D and the abnormality detection number 23E, the abnormality detection information 23F at an abnormality detection location, and the like. As a result, the neighboring wireless terminal 2A may notify the collection server 4 of the route transmission packet 23 including the GPS log 23D, the abnormality detection number 23E, the abnormality detection information 23F, and the like.

Figure 12:
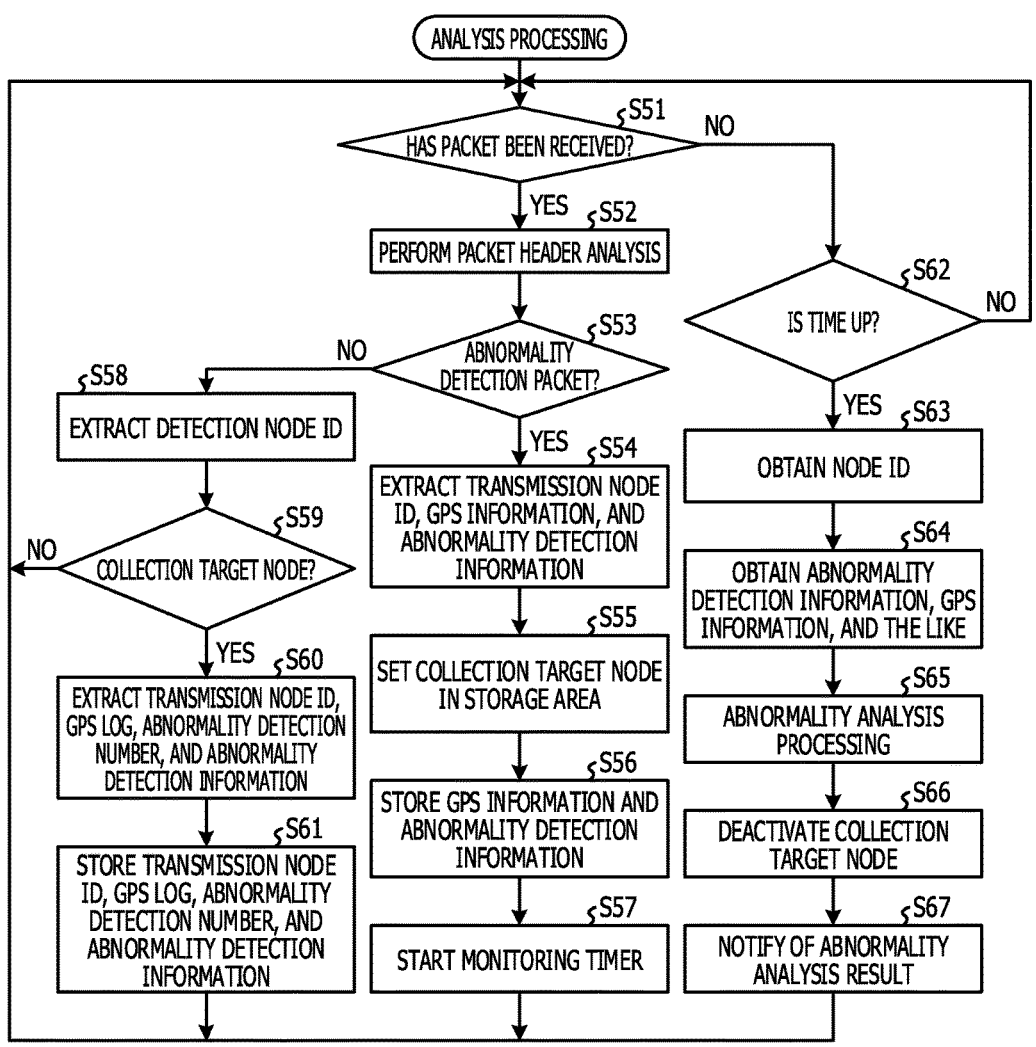
FIG. 12 is a flowchart illustrating an example of processing operation performed by CPU of a collection server involved in analysis processing.

FIG. 12 is a flowchart illustrating an example of processing operation performed by the CPU 43 of the collection server 4 involved in analysis processing. Analysis processing illustrated in FIG. 12 is processing of analyzing the abnormality detection packet 22 transmitted from the wireless terminal 2 and the route transmission packet 23 transmitted from the wireless terminal 2A and analyzing an abnormality detection location and an area that is highly likely to include an abnormality detection location.

In FIG. 12, the CPU 43 of the collection server 4 determines whether or not a packet has been received from the wireless terminal 2 or the wireless terminal 2A via the communication interface 41 (S51). If a packet has been received from the wireless terminal 2 or the wireless terminal 2A (YES in S51), the CPU 43 analyzes a packet header in the received packet (S52). The CPU 43 determines, on the basis of the analysis result, whether or not the received packet is the abnormality detection packet 22 (S53).

If the received packet is the abnormality detection packet 22 (YES in S53), the CPU 43 extracts the transmission node ID, the GPS information, and the abnormality detection information included in the abnormality detection packet 22 (S54). The CPU 43 sets, as the collection target node, the wireless terminal 2 corresponding to the extracted transmission node ID in the information storage area 42A (S55). The CPU 43 stores the extracted GPS information and the extracted abnormality detection information in the information storage area 42A corresponding to the collection target node (S56). The CPU 43 starts the monitoring timer for the collection target node (S57). Thereafter, the CPU 43 causes the process to proceed to S51 to determine whether or not a packet has been received.

If the received packet is not the abnormality detection packet 22 (NO in S53), the CPU 43 determines that the received packet is the route transmission packet 23 and extracts the detection node ID included in the route transmission packet 23 (S58). After extracting the detection node ID, the CPU 43 determines whether or not the detection node ID is the collection target node ID (S59). If the detection node ID is the collection target node ID (YES in S59), the CPU 43 extracts the transmission node ID 23B, the GPS log 23D, the abnormality detection number 23E, and the abnormality detection information 23F included in the route transmission packet 23 (S60). The CPU 43 stores the transmission node ID 23B, the GPS log 23D, the abnormality detection number 23E, and the abnormality detection information 23F that have been extracted in the information storage area 42A corresponding to the collection target node (S61). Thereafter, the CPU 43 causes the process to proceed to S51 to determine whether or not a packet has been received.

If the detection node ID is not the collection target node ID (NO in S59), the CPU 43 causes the process to proceed to S51 to determine whether or not a packet has been received.

If a packet has not been received (NO in S51), the CPU 43 determines whether or not the monitoring timer of the collection target node, which is set in S57, indicates that time is up (S62). If the monitoring timer of the collection target node indicates that time is up (YES in S62), the CPU 43 obtains the node ID of the collection target node for which the monitoring timer indicates that time is up (S63).

The CPU 43 obtains various types of information, such as the abnormality detection information, the GPS information, and the like, stored in the information storage area 42A corresponding to the collection target node for which the monitoring timer indicates that time is up (S64). The CPU 43 executes analysis processing on the basis of road surface information, such as the abnormality detection information, the GPS information, and the like (S65). Note that analysis processing is processing of analyzing an abnormality detection location and an area that is highly likely to include an abnormality detection location on the basis of the road surface information, such as the abnormality detection information, the GPS information, and the like. After the CPU 43 executes analysis processing, the CPU 43 deactivates the collection target node (S66), notifies the management terminal 5 of the analysis result of the analysis processing (S67). Thereafter, the CPU 43 causes the process to proceed to S51 to determine whether or not a packet has been received.

If the monitoring timer does not indicate that time is up (NO in S62), the CPU 43 causes the process to proceed to S51 to determine whether or not a packet has been received.

If the CPU 43 of the collection server 4 that executes analysis processing illustrated in FIG. 12 receives the abnormality detection packet 22, the CPU 43 sets, as the collection target node, the transmission node ID 22B included in the abnormality detection packet 22 in the information storage area 42A. The CPU 43 stores the GPS information 22C and the abnormality detection information 22D included in the abnormality detection packet 22 in the information storage area 42A corresponding to the set collection target node. If the CPU 43 receives the route transmission packet 23 and the detection node ID 23C included in the received route transmission packet 23 is the collection target node ID, the CPU 43 stores information included in the route transmission packet 23 in the information storage area 42A corresponding to the collection target node. The information included in the route transmission packet 23 is information, such as the transmission node ID 23B, the GPS log 23D, the abnormality detection number 23E, the abnormality detection information 23F, and the like, included in the route transmission packet 23.

The CPU 43 receives packets relating to the collection target node until the monitoring timer indicates that time is up, analyzes the road surface information, such as the abnormality detection information, the GPS information, and the like, which corresponds to the collection target node for which the monitoring timer indicates that time is up, and analyzes an abnormality detection location and an area that is highly likely to include an abnormality detection location. Then, the CPU 43 notifies the management terminal 5 of an abnormality detection location and an area that is highly likely to include an abnormality detection location. As a result, the management terminal 5 may recognize, on the basis of the analysis result, for example, the abnormality detection location and the area that is highly likely to include the abnormality detection location.

If the wireless terminal 2 according to the present embodiment detects a road surface abnormality using the acceleration sensor 13, the wireless terminal 2 transmits the abnormality notification packet 21 to neighboring wireless terminals 2A within the short-distance wireless range in broadcast communication. If a neighboring wireless terminal 2A receives the abnormality notification packet 21 from the wireless terminal 2, the neighboring wireless terminal 2A starts the GPS 14 of the self-terminal, activates the acceleration sensor 13 and the GPS 14, and stops, after a predetermined time has elapsed since the start of the GPS 14, a measurement operation of the GPS 14. As a result, each wireless terminal 2A starts the GPS 14 in response to the abnormality notification packet 21, performs logging of the travel route of the self-terminal using the GPS 14, and stops the GPS 14 after the monitoring timer of the GPS 14 indicates that time is up, and therefore, the power consumption of the GPS 14 may be reduced.

Even when the wireless terminal 2 that has detected the abnormality is not started the GPS 14, the collection server 4 may identify, for example, an abnormality detection location and an area that is highly likely to include an abnormality detection location, on the basis of the GPS log and the abnormality detection information that have been collected by the neighboring wireless terminals 2A within the short-distance wireless range. When the wireless terminal 2 detects an abnormality before the GPS 14 is started, it takes a time to start the GPS 14, and thus, the wireless terminal 2 may not accurately identify an abnormality detection location. However, the collection server 4 may identify an abnormality detection location and an area that is highly likely to include an abnormality detection location on the basis of road surface information and the like transmitted from the neighboring wireless terminals 2A.

The neighboring wireless terminal 2A does not keep the GPS 14 in a logging state at all times, but starts the GPS 14 upon receiving the abnormality notification packet 21, continues logging of the travel route of the self-terminal until the operation timer indicates that time is up, and then, stops the GPS 14. As a result, the power consumption of the GPS 14 in the neighboring wireless terminal 2A may be reduced.

According to the present embodiment, increased accuracy in measuring an abnormality detection location may be achieved while the power consumption of the wireless terminal 2 is reduced.

In the above-described embodiment, a road surface abnormality is determined using the acceleration sensor 13 when the acceleration in the vertical direction exceeds a threshold. However, a road surface abnormality may be determined using the acceleration sensor 13 when the measurement result expresses a specific pattern.

In the above-described embodiment, the wireless terminal 2 transmits, when a road surface abnormality is detected, the abnormality notification packet 21 to each wireless terminal 2 within the short-distance wireless range in broadcast communication. However, the wireless terminal 2 may transmit the abnormality notification packet 21 thereto in unicast communication.

In the above-described embodiment, the GPS information 22C included in the abnormality detection packet 22 includes the current location, the start time, the moving speed, and the moving direction therein. However, the present disclosure is not limited thereto, and the GPS information 22C may include, at least, the current location and the start time.

In the above-described embodiment, when the wireless terminal 2 passes the GPS positioned point 50A, there is not a road surface abnormality in the same direction as the travelling direction of the wireless terminal 2 unless the wireless terminal 2 turns back on the way. Therefore, when the CPU 43 of the collection server 4 knows the travelling direction of the wireless terminal 2, an area that is highly likely to include an abnormality detection location does not have a precise circle shape but an egg shape of which a travelling direction side distance is short. A probability that an abnormality is included is lower at the travelling direction side.

In the above-described embodiment, the CPU 43 of the collection server 4 estimates the estimate range 50 by multiplying the moving speed and the start time included in the GPS information 22C included in the abnormality detection packet 22 together. However, the collection server 4 may use, instead of the moving speed, an average travel speed of a bicycle.

In the above-described embodiment, the collection server 4 executes analysis processing for road surface information regarding a collection target node to analyze an abnormality detection location and an area that is highly likely to include an abnormality detection location, and notifies the management terminal 5 of the analysis result. The collection server 4 may be configured to delete, after the collection server 4 notifies the management terminal 5 of the analysis result, the road surface information regarding the collection target node stored in the information storage area 42A corresponding to the collection target node. Alternatively, the collection server 4 may be configured to not to delete, after the collection server 4 notifies the management terminal 5 of the analysis result, the road surface information regarding the collection target node stored in the information storage area 42A corresponding to the collection target node but to leave the road surface information for additional check or as an evidence for determination.

In the present embodiment, the road surface monitor system 1 that monitors a road surface abnormality has been described as an example, but a monitor target is not limited to a road surface abnormality, and the present disclosure is applicable to an event monitoring system that detects an event on the basis of a measurement value of a first measurement unit and analyzes a detection location of the event on the basis of a measurement value of a second measurement unit, and the like.

Each component element of each unit illustrated in the drawings may not be physically configured as illustrated in the drawings. That is, specific embodiments of disintegration and integration of each unit are not limited to those illustrated in the drawings, and all or some of the units may be disintegrated or integrated functionally or physically in an arbitrary unit in accordance with various loads, use conditions, and the like.

All or some of the processing functions performed by each unit may be executed by a CPU or on a microcomputer such as a micro processing unit (MPU), a micro controller unit (MCU), and the like. It is needless to say that all or some of the processing functions may be realized using a CPU or a microcomputer such as an MPU, MCU, and the like that executes a program or using a hard-wired logic circuit.

Second Embodiment

Figure 13:
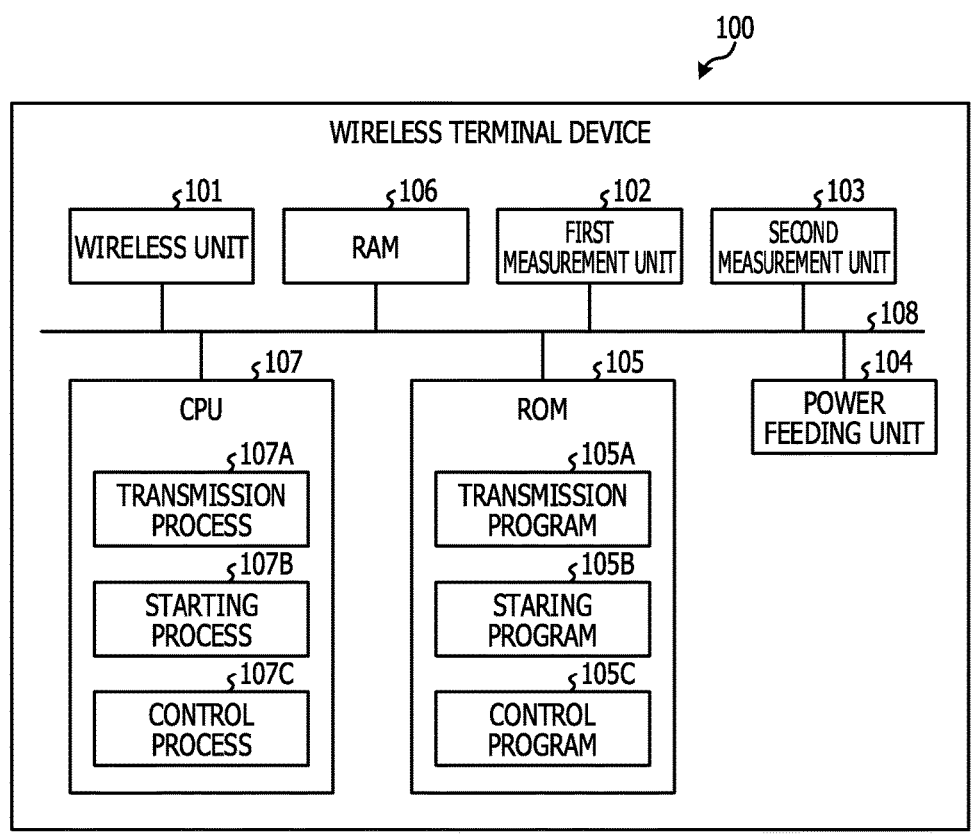
FIG. 13 is a diagram illustrating an example of a wireless terminal device that executes a measurement processing program.

Various processes described in the present embodiment may be realized by causing a processor, such as a CPU and the like, provided in a wireless terminal device, to execute a program prepared in advance. Then, in the following embodiment, an example of a wireless terminal device that executes a program for achieving similar functions to those in the above-described embodiment will be described. FIG. 13 is a diagram illustrating an example of a wireless terminal device that executes a measurement processing program.

A wireless terminal device 100 illustrated in FIG. 13, which executes a measurement processing program, includes a wireless unit 101, a first measurement unit 102, a second measurement unit 103, a power feeding unit 104, a ROM 105, a RAM 106, a CPU 107, and a bus 108. The wireless unit 101, the first measurement unit 102, the second measurement unit 103, the power feeding unit 104, the ROM 105, the RAM 106, and the CPU 107 are connected together via the bus 108. The power feeding unit 104 supplies power to each component element in the wireless terminal device 100. The second measurement unit 103 has large power consumption, as compared to the first measurement unit 102.

In the ROM 105, a measurement processing program in which similar functions as those in the above-described embodiment are described is stored in advance. As the measurement processing programs, a transmission program 105A, a staring program 105B, and a control program 105C are stored in the ROM 105. The measurement processing program may be recorded not in the ROM 105 but in a computer-readable recording medium that is readable by a drive (not illustrated). The recording medium may be, for example, a transportable recording medium such as a compact disc ROM (CD-ROM), a digital versatile disc (DVD), a universal serial bus (USB) memory, and the like, and a semiconductor memory such as a flash memory, and the like.

The CPU 107 executes a transmission process 107A in accordance with the transmission program 105A read out from the ROM 105. The CPU 107 executes a starting process 107B in accordance with the staring program 105B read out from the ROM 105. The CPU 107 executes a control process 107C in accordance with the control program 105C read out from the ROM 105.

If an event is detected on the basis of a measurement value of the first measurement unit 102, the CPU 107 transmits a notification signal to neighboring wireless terminal devices located in the vicinity of the wireless terminal device 100. If the CPU 107 detects a notification signal transmitted from another wireless terminal device, the CPU 107 starts the second measurement unit 103 of the wireless terminal device 100. When the second measurement unit 103 is started, the CPU 107 activates measurement operations in the first measurement unit 102 and the second measurement unit 103. After a set time has elapsed since the start of the second measurement unit 103, the CPU 107 stops the measurement operation of the second measurement unit 103. As a result, the power consumption used by the second measurement unit 103 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An event location analysis system, comprising:
a first wireless terminal device configured to communicatively couple to a second wireless terminal device, the first wireless terminal including:
a first measurement sensor,
a first measurement system configured to position a location of the first wireless terminal, the first measurement system having a larger power consumption than the first measurement sensor, and
a first processor configured to
transmit, to the second wireless terminal device, a first notification signal including information indicating a first event, upon detecting the first event on basis of a measurement value of the first measurement sensor,
start the first measurement system upon receiving, from the second wireless terminal device, a second notification signal including information indicating a second event detected by a second measurement sensor of the second wireless terminal device,
activate a measurement operation of the first measurement sensor and a measurement operation of the first measurement system, after the first measurement system is started, and
stop the measurement operation of the first measurement system after a determined time for the first wireless terminal device has elapsed since the start of the first measurement system.

2. The event location analysis system according to claim 1, wherein the second wireless terminal device includes:
the second measurement sensor,
a second measurement system configured to position a location of the second wireless terminal device, the fourth measurement system having larger power consumption than the third measurement system, and
a second processor configured to
start the second measurement system upon receiving the first notification signal from the first wireless terminal device,
activate a measurement operation of the third measurement sensor and a measurement operation of the second measurement system, after the second measurement system is started, detect the second event on basis of a measurement value of the second measurement sensor, stop the measurement operation of the second measurement system after a determined time for the second wireless terminal has elapsed since the start of the second measurement system, and transmit, after the measurement operation of the second measurement system is stopped, a detection result for the second event and a measurement result of the second measurement system; and a management device including:
a third processor configured to
receive the detection result and the measurement result from the second wireless terminal device, and analyze a detection location of the second event on basis of the received detection result and the received measurement result.

3. The event location analysis system according to claim 2, wherein the first processor is further configured to
start the first measurement system upon detecting the first event, activate a measurement operation of the first measurement system, after the first measurement system is started, and transmit a measurement result of the first measurement system to the management device.

4. The event location analysis system according to claim 2, wherein the measurement result is obtained before the determined time has elapsed since the activation of the measurement operation of the second measurement system.

5. A measurement processing method, comprising:
executing, by a first wireless terminal device including a first measurement sensor and a first measurement system configured to position a location of the first wireless terminal, the first measurement system having a larger power consumption than the first measurement sensor, a process including, transmitting, to a second wireless terminal device, a first notification signal including information indicating a first event, upon detecting the event on basis of a measurement value of the first measurement sensor;

starting the first measurement system upon receiving, from the second wireless terminal device, a second notification signal including information indicating a second event detected by a second measurement sensor of the second wireless terminal device;

activating a measurement operation of the first measurement sensor and a measurement operation of the first measurement system, after the first measurement system is started; and stopping the measurement operation of the first measurement system after a determined time for the first wireless terminal device has elapsed since the start of the first measurement system.

6. A non-transitory computer-readable recording medium having stored therein a program for causing wireless terminal devices to execute a process, the process comprising:

executing, by a first wireless terminal device, among the wireless terminals, including a first measurement sensor and a first measurement system configured to position a location of the first wireless terminal, the first measurement system having a larger power consumption than the first measurement sensor, a process including, transmitting, to a second wireless terminal device among the wireless terminal devices, a first notification signal including information indicating a first event, upon detecting the event on basis of a measurement value of the first measurement sensor;

starting the first measurement system upon receiving, from the second wireless terminal device, a second notification signal including information indicating a second event detected by a second measurement sensor of the second wireless terminal device;

activating a measurement operation of the first measurement sensor and a measurement operation of the first measurement system, after the first measurement system is started; and stopping the measurement operation of the first measurement system after a determined time for the first wireless terminal device has elapsed since the start of the first measurement system.

* * * * *